United States Patent Office 2,880,097
Patented Mar. 31, 1959

2,880,097

ZIRCON REFRACTORY COMPOSITION AND METHOD OF MAKING IT

Donald E. Emhiser, Brackenridge, Pa., assignor to Pittsburgh Plate Glass Company, Allegheny County, Pa., a corporation of Pennsylvania No Drawing. Application December 30, 1954
Serial No. 478,903

14 Claims. (Cl. 106—57)

This invention relates to zircon refractory compositions and the method of making these compositions. This invention especially relates to zircon refractory compositions from which refractory articles can be made by slip casting.

Zircon is essentially zirconium silicate ($ZrSiO_4$). The theoretical composition of zirconium silicate is 67.2% zirconia ($ZrO_2$) and 32.8% silica ($SiO_2$). The high melting point of zircon and its relatively low coefficient of thermal expansion, as well as other physical characteristics, make zircon a suitable refractory raw material. However, in the forming of refractory articles with zircon difficulty is encountered in the preparation of zircon slips. In the formation of zircon slips by adding minus 325 mesh zircon to water it was found that too much water was required to give a sufficiently low viscosity to the mixture for casting by pouring. When mixtures containing 20 parts or more of water per 100 parts of zircon were used for slip casting the zircon in the slip would not stay in suspension for a sufficiently long time for casting and the resulting unfired refractory body had high shrinkage and low strength.

It is an object of this invention to provide a zircon-containing composition suitable for forming a slip that can be cast and dried to form refractory articles having satisfactory structural strength before and after firing.

It is another object of this invention to provide a zircon slip with a sufficiently low viscosity to be suitable for casting and yet contain only a small amount of water.

It is a further object of the present invention to provide a zircon slip in which a substantial portion of the zircon has an average particle size greater than 44 microns.

It is still a further object of this invention to provide a zircon slip having a maximum of about 10 parts of water per 100 parts of zircon and yet have quick-setting characteristics for solid casting.

Still a further object of this invention is to provide a method for the formation of the zircon-containing compositions and zircon slips of the foregoing objects.

These and other objects will be apparent to one skilled in the art from the description which follows.

I have found that, when a small amount of sodium silicate, which contains 6 to 10% by weight sodium oxide and the weight ratio of sodium oxide to silica is between 1:3 and 1:4, is used with zircon and water to prepare the zircon slip, satisfactory slips are obtained using between 9 and 18 parts of water per 100 parts of zircon. Examples of commercial sodium silicates which can be used as the sodium silicate for the zircon slips of the present invention are: sodium silicate containing 6.7% $Na_2O$, 25.3% $SiO_2$ and the balance water and having a density of 1.30+ (33.5° Baumé); sodium silicate containing 8.9% $Na_2O$, 28.5% $SiO_2$ and the balance water and having a density of 1.39+ (41.1° Baumé); and sodium silicate containing 9.1% $Na_2O$, 29.3% $SiO_2$ and the balance water and having a density of 1.41+ (42.2° Baumé).

The amount of the sodium silicate used can be varied between 0.05 and 0.2 part per 100 parts of zircon. When the amount of water used is of the order of 9 to 10 parts of water to 100 parts of zircon, 0.002 to 0.03 part of a material capable of providing divalent metal cations in the water per 100 parts of zircon is used along with the sodium silicate to provide a zircon slip suitable for solid casting. In the zircon slips of the present invention the zircon, sodium silicate, water and material capable of providing divalent metal cations constitute greater than 99% of the composition.

The sodium silicate can be incorporated in the zircon slip in several ways. Sodium silicate in the recited proportion can be mixed with zircon and the mixture then mixed with water to form the slip. In another method of forming the slip the zircon and water are mixed and while mixing sodium silicate is added. In another method the sodium silicate is dissolved in the water of the slip composition and this solution is then mixed with zircon to form the slip.

The amount of sodium silicate is dependent upon the method of casting for which the zircon slip is to be used. When using drain casting the amount of sodium silicate is 0.1 to 0.2 part per 100 parts of zircon and in order to obtain a slip having satisfactory characteristics, such as low viscosity, the amount of water is 14 to 18 parts per 100 parts of zircon. If more than 18 parts of water is used, the slip is too thin so that the final product after casting and drying does not have sufficient structural strength. To obtain the best refractory article the water content should be 14 to 15 parts of water per 100 parts of zircon.

When using solid casting for the production of massive zircon refractory bodies, it was found possible to reduce considerably the amount of water used. To permit water reduction the sodium silicate content must be in the range of from 0.05 to 0.1 part and preferably 0.08 to 0.1 part per 100 parts of zircon. In order to provide quick setting of this zircon slip, in which 9 to 10 parts of water per 100 parts of zircon is used, it was found necessary to incorporate in the zircon slip a material capable of providing divalent metal cations in the water. Such materials include compounds which are slightly soluble in water, such as alkaline earth metal oxide, as well as materials which are only very slightly soluble in water. Examples of alkaline earth metal oxides which are used to provide divalent metal cations are lime or calcium oxide, barium oxide and strontium oxide. An example of the latter type of material is Portland cement. Dicalcium silicate, which is an essential constituent of Portland cement, is another example of a material capable of providing divalent metal cations to the water component of the zircon slip. By the use of the combination of sodium silicate and the material providing divalent metal cations to obtain suitable zircon slips the amount of material detrimental to the load-bearing capacity of zircon articles is minimized.

In zircon slips suitable for solid casting, 0.002 to 0.015 part of the alkaline earth metal oxide per 100 parts of zircon is used. Portland cement and similar materials, such as dicalcium silicate, are used in such zircon slips for solid casting in an amount between 0.01 and 0.03 part per 100 parts of zircon. In all of the zircon slips for solid casting 0.05 to 0.1 part of sodium silicate and 9 to 10 parts of water per 100 parts of zircon are used. The amount of lime is preferably 0.009 part per 100 parts of zircon and the preferred amount of Portland cement is from 0.02 to 0.03 part per 100 parts of zircon. In such preferred compositions from 0.08 to 0.1 part of sodium silicate per 100 parts of zircon is used.

In zircon slip compositions containing the specified amounts of sodium silicate and Portland cement or lime to reduce the viscosity and provide suitable setting time more than 10 parts of water per 100 parts of zircon results in a cavity in the cast article. For example, a slip containing 11 parts of water per 100 parts of zircon was unsatisfactory.

In slip casting heretofore carried out using zircon slips the slips contained 16 to 17 parts of water per 100 parts of zircon. Articles made by solid casting and using the zircon slips of this invention in which the water content is between 9 and 10 parts of water per 100 parts of zircon exhibit considerably less shrinkage in the drying step. This reduced shrinkage resulted in cast bodies having shapes and dimensions more nearly representative of the mold and cast bodies can be obtained essentially free of cracks.

From the foregoing description of the zircon slips of the present invention it is apparent that there are two classes of zircon slip compositions recited, namely, those suitable for drain casting and those suitable for solid casting. In the former the amount of sodium silicate used is 0.1 to 0.2 part of sodium silicate per 100 parts of zircon while in the latter slip composition the amount of sodium silicate is 0.05 to 0.1 part, so that the range of 0.05 to 0.2 part covers the compositions without any gap. However, in the case of the water content it is to be noted that the former type of zircon slip utilizes 14 to 18 parts of water per 100 parts of zircon while in the zircon slips for solid casting the range is from 9 to 10 parts of water per 100 parts of zircon. Thus it is seen that there is a gap between the two ranges and, of course, the appropriate range is chosen in accordance with the type of casting to be used. It is also apparent from the foregoing that, when solid casting is to be the casting method, a material such as Portland cement or lime is to be incorporated in the zircon slip to produce a slip with a satisfactory setting time and it is necessary to reduce the amount of sodium silicate to the range of 0.05 to 0.1 part per 100 parts of zircon.

In the foregoing description of the zircon slips for drain casting it was mentioned that the water content can be between 14 and 18 parts per 100 parts of zircon. When the zircon is substantially entirely of a material which is minus 325 mesh, that is, has an average particle size of less than 44 microns, the amount of water necessary for producing a satisfactory zircon slip is of the order of 17 to 18 parts per 100 parts of zircon. It was found that it was possible to use granular zircon with the finely ground or milled zircon, the latter being the aforesaid minus 325 mesh zircon. When the amount of granular zircon, that is, a material having an average particle size greater than 44 microns, is used in an amount of about 10 or 20% of the zircon content the water content can be reduced to as low as 14 parts per 100 parts of zircon and still produce a satisfactory zircon slip.

For zircon slips of this invention which are suitable for solid casting and in which materials capable of producing divalent metal cations in the water, such as Portland cement and lime, it is necessary to use only a sodium silicate content between 0.05 and 0.1 part per 100 parts of zircon as mentioned above. No more than 10 parts of water per 100 parts of zircon is used; otherwise, the desired setting characteristics is not obtainable even with adjustment of the sodium silicate content. The zircon of these slips for solid casting preferably contains 20 to 60% granular zircon and 40 to 80% milled zircon to produce refractory bodies having improved structural strength. For best results the zircon is at least 40% granular and the balance is milled zircon.

Using the suitable zircon slips described above for drain casting it has been found possible to drain cast three-inch crucibles having wall thickness up to about three-quarters of an inch. The drain casting of three-inch crucibles having a wall thickness of about one-quarter of an inch was quite easily accomplished. In order to prevent sticking in drain casting it was found necessary to completely dry the molds between castings.

Using the suitable zircon slips described above for solid casting a number of eight-inch pots were successfully cast. In these casting operations it was found that it was not necessary to dry the molds between castings and, as a matter of fact, slightly damp molds were found to be advantageous. The procedure for producing eight-inch pots comprised pouring the correct amount of slip into the mold, inserting the core and leaving it in place for twenty minutes. After the twenty minutes the slip has set sufficiently to allow removal of the core without danger of the pot slumping. The core was then removed; otherwise, the set zircon composition would shrink around it sufficiently to make later removal impossible. Refractory blocks as large as 4″ x 6″ x 10″ were easily fabricated from the zircon slip by solid casting.

In the following examples of production of satisfactory crucibles using zircon slips suitable for either drain casting or solid casting, the zircon used was either milled zircon alone or a mixture of milled zircon with granular zircon. Both of these zircons have approximately the same chemical composition and differ only in particle size. A typical chemical analysis was 65.03% $ZrO_2$, 33.9% $SiO_2$, 0.76% $Al_2O_3$, 0.07% $Fe_2O_3$, 0.17% $TiO_2$, 0.04% CaO, 0.001% $Cr_2O_2$, 0.17% $P_2O_5$, and 0.05% alkali metal oxides. Milled zircon was 99.9% minus 325 mesh, while granular zircon was 74.7% on 140 mesh, 24.7% through 140 mesh and on 180 mesh and 0.6% through 180 mesh. Thus it is seen that milled zircon has an average particle size less than 44 microns, that is, it is minus 325 mesh material, while granular zircon has an average particle size greater than 44 microns.

The amounts of materials expressed in this application are parts by weight per 100 parts by weight of zircon.

*Example I*

A zircon slip was prepared using 100 parts of milled zircon and 0.18 part of sodium slicate and 18 parts of water. The sodium silicate used in this and subsequent examples contained 6.7% $Na_2O$, 25.3% $SiO_2$ and the balance water and had a density of 1.30+. The zircon slip was used by drain casting to form a three-inch zircon crucible. The slip was poured in a plaster of Paris mold. After a layer of zircon of the desired thickness had formed against the mold, the excess slip was poured out. The molded crucible was removed from the mold, dried and fired at a temperature of about 2650° F.

*Example II*

A three-inch crucible was prepared by drain-casting, drying and firing as in Example I except the zircon slip contained 0.1 part of sodium silicate and 14 parts of water per 100 parts of zircon. In addition the zircon was 10% granular zircon and 90% milled zircon.

*Example III*

A satisfactory crucible was prepared as in Example II using a mixture of 20% granular and 80% milled zircon. The slip contained 0.15 part of sodium silicate and 15 parts of water per 100 parts of zircon.

*Example IV*

A zircon slip was prepared using 80% milled zircon and 20% granular zircon. The slip contained 0.1 part of sodium silicate, 0.025 part of Portland cement and 9 parts of water per 100 parts of zircon. The Portland cement used in this and two of the subsequent examples had the following analysis: 20.07% $SiO_2$; 6.09% $Al_2O_3$; 2.23% $Fe_2O_3$; 0.36% $TiO_2$; 65.28% CaO; 1.23% MgO; 0.85% alkali metal oxides; 0.08% $P_2O_5$; 2.55% $SO_3$; 0.10% MnO; and 1.71% loss on ignition.

This slip immediately after preparation was used for the solid casting of an eight-inch pot by pouring the slip into a mold and inserting a core. After twenty minutes the core was removed and the set zircon batch now shaped in the form of an eight-inch pot was allowed to dry and the dried pot was fired at 2650° F.

*Example V*

An eight-inch crucible was made in accordance with the process described in Example IV using a zircon slip in which the zircon was 30% granular and 70% milled and in which 0.087 part of sodium silicate, and 0.025 part of Portland cement were used along with 10 parts of water per 100 parts of zircon.

*Example VI*

An eight-inch crucible was made as in Example V but in the zircon slip 0.009 part of lime was used instead of 0.025 part of Portland cement per 100 parts of zircon.

*Example VII*

In this example a crucible was prepared in accordance with the method described in Example IV and the zircon slip had the same composition as described in Example V except that the zircon was 40% granular and 60% milled.

In the manufacture of crucibles or pots for melting glass using refractory materials heretofore used it was necessary to choose a material in the form of a slip which as a cast pot would have its inner surface shrink away from the core and its outer surface at the same time shrink away from the outside mold. This concurrent shrinkage would occur for only a brief interval of time and then the entire composition would begin to shrink in a conventional manner with all the dimensions becoming progressively smaller. It is during the concurrent shrinking of the outer surface from the pot mold and the inner surface from the plaster core that the slip changes from a fluid to a set state and the refractory pot is thereby slip cast off the pot mold. With zircon slips having compositions other than the zircon slips of the invention, the failure in the formation of the pots was due to vibrations that were set up as the refractory pots were slip cast off the mold. With zircon slips of this invention failure of the pot during formation due to vibrational shock was minimized and it was even possible to use granular material with milled zircon in the slip composition. From Example VII it is seen that a satisfactory crucible can be made using 40% of the zircon in a granular form.

Pots free of defects and highly resistant to thermal shock have been made by the solid casting method described above using zircon that was up to 60% zircon having an average particle size greater than 44 microns, i.e., using the granular zircon referred to above. The slips contained sodium silicate and either Portland cement or lime in amounts in accordance with the slip compositions of this invention. By using these large amounts of granular zircon a more economical refractory body is obtained because granular zircon is considerably cheaper than milled zircon. In addition, the refractory articles with large amounts of granular zircon have greater resistance to thermal shock.

The zircon crucibles or pots made in accordance with the present invention are suitable for the manufacture of various glasses including phosphate glasses. Zircon refractory bodies made in acocrdance with this invention include blocks and slabs for glass tank furnaces.

Three sets of zircon bars 1" x 1" x 4½" were prepared by solid casting and drying. For each set three bars were prepared. In the first set the zircon slip had the composition of Example IV. The second set had the composition of zircon slip in Example V while the zircon slip of the third set used the composition of Example VII. The three bars of a set were fired to different temperatures and then tested for modulus of rupture. The following values were obtained:

| Zircon Slip Composition of | Fired to— °F. | Modulus of Rupture, p.s.i. |
|---|---|---|
| Example IV | 2,650 | 4,428 |
| Do | 2,700 | 6,710 |
| Do | 2,750 | 6,650 |
| Example V | 2,650 | 4,343 |
| Do | 2,700 | 5,520 |
| Do | 2,750 | 4,771 |
| Example VII | 2,650 | 4,631 |
| Do | 2,700 | 4,860 |
| Do | 2,750 | 6,183 |

While each of the bars in an unfired condition had a very low modulus of rupture, the bars after firing at all three temperatures each had a very high modulus of rupture and the values of the fired bars are greater than that obtained by many refractory materials.

The foregoing are specific examples of the compositions of this invention for drain casting and solid casting and the method of making the same. These examples are presented for purposes of illustration and not by way of limitation. The invention is not to be limited except insofar as stated below in the claims.

I claim:
1. A fluid composition suitable for forming refractory articles consisting essentially of zircon, 0.05 to 0.1 part of sodium silicate, 9 to 10 parts of water and 0.002 to 0.03 part of a material capable of providing alkaline earth metal cations in said water per 100 parts of zircon, said sodium silicate containing 6 to 10% by weight of sodium oxide and the weight ratio of sodium oxide to silica being between 1:3 and 1:4.

2. A fluid composition suitable for forming refractory articles consisting essentially of zircon, 0.05 to 0.1 part of sodium silicate, 9 to 10 parts of water and 0.002 to 0.015 part of an alkaline earth metal oxide per 100 parts of zircon, said sodium silicate containing 6 to 10% by weight of sodium oxide and the weight ratio of sodium oxide to silica being between 1:3 and 1:4.

3. The fluid composition of claim 2 wherein the alkaline earth metal oxide is lime.

4. The fluid composition of claim 3 wherein the lime is present in an amount of about 0.009 part per 100 parts of zircon.

5. A fluid composition for forming refractory articles consisting essentially of zircon, 0.05 to 0.1 part of sodium silicate, 9 to 10 parts of water and 0.01 to 0.03 part of Portland cement per 100 parts of zircon, said sodium silicate containing 6 to 10% by weight of sodium oxide and the weight ratio of sodium oxide to silica being between 1:3 and 1:4.

6. A fluid composition suitable for forming refractory articles consisting essentially of zircon, 0.08 to 0.1 part of sodium silicate, 9 to 10 parts of water and 0.002 to 0.015 part of lime per 100 parts of zircon, said zircon comprising 20 to 60% zircon having an average particle size greater than 44 microns and 40 to 80% zircon having an average particle size less than 44 microns and said sodium silicate containing 6 to 10% by weight of sodium oxide and the weight ratio of sodium oxide to silica being between 1:3 and 1:4.

7. A fluid composition suitable for forming refractory articles consisting essentially of zircon, 0.08 to 0.1 part of sodium silicate, 9 to 10 parts of water and 0.01 to 0.03 part of Portland cement per 100 parts of zircon, said zircon comprising 20 to 60% zircon having an average particle size greater than 44 microns and 40 to 80% zircon having an average particle size less than 44 microns and said sodium silicate containing 6 to 10% by weight of sodium oxide and the weight ratio of sodium oxide to silica being between 1:3 and 1:4.

8. The method of preparing a fluid composition suitable for forming refractory articles comprising forming a mixture consisting essentially of zircon, 0.05 to 0.1 part of sodium silicate, 9 to 10 parts of water and 0.002 to 0.03 part of a material capable of providing alkaline earth metal cations in said water per 100 parts of zircon, said sodium silicate containing 6 to 10% by weight of sodium oxide and the weight ratio of sodium oxide to silica being between 1:3 and 1:4.

9. The method of preparing a fluid composition suitable for forming refractory articles comprising forming a mixture consisting essentially of zircon, 0.05 to 0.1 part of sodium silicate, 9 to 10 parts of water and 0.002 to 0.015 part of an alkaline earth metal oxide per 100 parts of zircon, said sodium silicate containing 6 to 10% by weight of sodium oxide and the weight ratio of sodium oxide to silica being between 1:3 and 1:4.

10. The method of claim 9 wherein the alkaline earth metal oxide is lime and is present in the amount of about 0.009 part per 100 parts of zircon.

11. The method of forming a fluid composition suitable for forming refractory articles comprising forming a mixture consisting essentially of zircon, 0.05 to 0.1 part of sodium silicate, 9 to 10 parts of water and 0.01 to 0.03 part of Portland cement per 100 parts of zircon, said sodium silicate containing 6 to 10% by weight of sodium oxide and the weight ratio of sodium oxide to silica being between 1:3 and 1:4.

12. The method of forming a zircon refractory body which comprises forming the fluid composition of claim 1, casting a quantity of the fluid composition to produce a shaped body, drying the shaped body and then firing the dried body.

13. The method of forming a zircon refractory body which comprises forming the fluid composition of claim 5, casting a quantity of the fluid composition to produce a shaped body, drying the shaped body and then firing the dried body.

14. The method of forming a zircon refractory body which comprises forming the fluid composition of claim 7, casting a quantity of the fluid composition to produce a shaped body, drying the shaped body and then firing the dried body.

References Cited in the file of this patent
UNITED STATES PATENTS

| | | |
|---|---|---|
| 1,375,077 | Buckman | Apr. 19, 1921 |
| 2,277,705 | Kinzie | Mar. 31, 1942 |
| 2,338,209 | Smith | Jan. 4, 1944 |
| 2,373,864 | Wainer | Apr. 17, 1945 |